US005934373A

United States Patent [19]
Warpinski et al.

[11] Patent Number: 5,934,373
[45] Date of Patent: Aug. 10, 1999

[54] APPARATUS AND METHOD FOR MONITORING UNDERGROUND FRACTURING

[75] Inventors: Norman R. Warpinski, Albuquerque; Terry D. Steinfort, Tijeras, both of N.Mex.; Paul T. Branagan; Roy H. Wilmer, both of Las Vegas, Nev.

[73] Assignee: Gas Research Institute, Chicago, Ill.

[21] Appl. No.: 08/790,292

[22] Filed: Jan. 29, 1997

Related U.S. Application Data

[60] Provisional application No. 60/010,880, Jan. 31, 1996.
[51] Int. Cl.$^6$ .................................................. E21B 47/00
[52] U.S. Cl. .................... 166/250.1; 166/308; 73/152.59
[58] Field of Search ................................ 166/66, 250.01, 166/250.1, 308; 73/152.54, 152.59

[56] References Cited

U.S. PATENT DOCUMENTS

| | | | |
|---|---|---|---|
| 4,271,696 | 6/1981 | Wood | 73/37 |
| 4,353,244 | 10/1982 | Wood | 73/37 |
| 4,942,929 | 7/1990 | Malachosky et al. | 175/66 |
| 5,108,226 | 4/1992 | Jennings, Jr. | 405/128 |
| 5,226,749 | 7/1993 | Perkins | 405/128 |
| 5,503,225 | 4/1996 | Withers | 166/250.1 |
| 5,524,709 | 6/1996 | Withers | 166/292 X |
| 5,574,218 | 11/1996 | Withers | 73/152.02 |

OTHER PUBLICATIONS

"Tiltmeters/Inclinometers Problem Solving Report", Question No. 0965961.001.
G. Holzhausen, Analysis of Earth Tilts Resulting From Formation of Six Hydraulic Fractures, Crack'R Frac Ex. #1, 3/27–28/79.
"Development of Stimulation Diagnostic Technology", Annual Report, Sandia National Laboratories, Sep. 1994.
"Development of Stimulation Diagnostic Technology", Annual Report, Sandia National Laboratories, Jul. 1995.
"GRI/DOE Multi–Sites Fracture Diagnostic Project: Monitor Well No. 1 Drilling, Data Analysis and Instrument Emplacement", Annual Report, Sandia National Laboratories, Feb. 1995.
"Development of Stipulation Diagnostic Technology"Annual Report, 5/90–12/91.
Branagan, et al., *Measuring the Hydraulic Fracture–Induced Deformation of Reservoirs and Adjacent Rocks Employing a Deeply Buried Inclinometer Array: GRI/DOE Mult–Site Project*, SPE International, 36451, 1996, pp. 1–13.
Warpinski, et al., *The Interface Test Series: An In Situ Study of Factors Affecting the Containment of Hydraulic Fractures*, Sandia Report, Feb. 1982, pp. 1–88.
Palmer, *Uplifts and Tilts at Earth's Surface Induced by Pressure Transients From Hydraulic Fractures*, SPE Production Engineering, Aug. 1990, pp. 324–332.
Evans, *Some Examples and Implications of Observed Elastic Deformation Associated with Growth of Hydraulic Fractures in the Earth*, Lamont–Doherty Geological Observatory, Columbia University, pp. 246–259.
Warpinski et al., *Interpretation of Hydraulic Fracture Mapping Experiments*, SPE International, SPE 27985, pp. 291–300 Aug. 1994.

*Primary Examiner*—Roger Schoeppel
*Attorney, Agent, or Firm*—Pauley Petersen Kinne & Fejer

[57] ABSTRACT

An apparatus and method for measuring deformation of a rock mass around the vicinity of a fracture, commonly induced by hydraulic fracturing is provided. To this end, a well is drilled offset from the proposed fracture region, if no existing well is present. Once the well is formed to a depth approximately equal or exceeding the depth of the proposed fracture, a plurality of inclinometers, for example tiltmeters, are inserted downhole in the well. The inclinometers are located both above and below the approximate depth of the proposed fracture. The plurality of inclinometers may be arranged on a wireline that may be retrieved from the downhole portion of the well and used again or, alternatively, the inclinometers may be cemented in place. In either event, the inclinometers are used to measure the deformation of the rock around the induced fracture.

51 Claims, 9 Drawing Sheets

APPARATUS AND METHOD FOR MONITORING UNDERGROUND FRACTURING

CROSS-REFERENCE TO RELATED APPLICATIONS

This application claims the benefit of U.S. Provisional Application No. 60/010,880, filed Jan. 31, 1996.

The U.S. Government has a paid-up license in this invention and the right in limited circumstances to require the patent owner to license others on reasonable terms as provided for by the terms of Contract No. DE-F104-91AL65092 awarded by the U.S. Department of Energy.

BACKGROUND OF THE INVENTION

In certain situations, workers in the oil and gas industry perform a procedure known as "hydraulic fracturing" during oil exploration and drilling operations. For example, in formations where oil or gas cannot be easily or economically extracted from the earth, a hydraulic fracturing operation is commonly performed. Such a hydraulic fracturing operation includes pumping in large amounts of fluid to induce cracks in the earth, thereby creating pathways via which the oil and gas may flow. After a crack is generated, sand or some other material is commonly added to the crack, so that when the earth closes back up after the pressure is released, the sand helps to keep the earth parted. The sand then provides a conductive pathway for the oil and gas to flow from the newly formed fracture.

However, the hydraulic fracturing process does not always work very well. The reasons for this are relatively unknown. In addition, the hydraulic fractures cannot be readily observed, since they are typically thousands of feet below the surface of the earth. Therefore, members of the oil and gas industry have sought diagnostic methods to tell where the fractures are, how big the fractures are, how far they go and how high they grow. Thus, a diagnostic apparatus and method for measuring the hydraulic fracture and the rock deformation around the fracture are needed.

In previous attempts to solve this problem, certain methods have been developed for mapping fractures. For example, one of these methods involves seismic sensing. In such a seismic sensing operation, micro-earthquakes generated by the fracturing are analyzed by seismic meters, for example, accelerometers.

A second known type of fracture mapping involves running analytical models which are based only on pressure measurements taken at the fracture region. Another method of attempting to map the fractures is performed by using radioactive materials. The radioactive materials are inserted into the earth, and then radioactive counters are used to determine where the radioactive materials are to help in the determination of the geometry of the fracture.

Surface tiltmeter arrays have also been used in assessing hydraulic fracture geometry. Tiltmeters operate like a level in that they can detect any deviation or tilt in position from horizontal that may be caused by the hydraulic fracturing process. By definition, surface tiltmeter arrays are located only on the surface of the earth. This causes a major problem in that the signals acquired at the surface array are extremely small since they have to pass through approximately 5,000–10,000 feet of earth before reaching the surface where the meter is located.

Tiltmeters are sensitive instruments for measuring an angular rotation within a ground mass. Tiltmeters have been employed for many years in monitoring the deformation of ground masses due to earthquakes, volcanism, earth tides, and many underground processes associated with resource extraction and waste disposal. In such situations, tiltmeters have been employed in various linear and areal arrays, usually on the surface of the earth, but occasionally in mines or other underground openings very near the surface. Tiltmeters can be packed in place with sand or cemented in place permanently.

Tiltmeters can be designed in many ways, but the most sensitive commercial instruments use bi-axial electrolytic tilt sensors to measure the tilt in two orthogonal vertical planes. Such devices can measure rotations with nanoradian sensitivity and accuracy (1 nanoradian=$5.7 \times 10^{-8}$ degrees= 0.0002 arc sec).

The arrays are normally deployed at surface locations in shallow sand-filled holes, e.g., 10 ft. to 30 ft. deep. Typical deployment occurs in an extended elliptical or circular geometries surrounding the expected surface projection of the fracture azimuth. The composite data from this horizontally deployed array is inverse modeled to provide the engineer with a most probable set of fracture parameters, such as dip and fracture azimuth, related to the interpretation of measured deformation.

As set forth above, the surface tilt array for hydraulic-fracture mapping is generally circular, but may have additional sensors at strategic locations. Tiltmeters are usually put in shallow holes (10–30 ft.) to minimize surface noise due to the solar heating and cultural causes and to avoid as much of the unconsolidated surface layers as possible. During a hydraulic fracture at depth (usually depths up to 5000 ft can be monitored with tiltmeters), the ground experiences a slight rotation due to the expanding fracture that will vary with location around the fracture plane. These rotations are measured by the tiltmeter, and models of the expected behavior are compared with the tilt results to estimate fracture characteristics. However, tilts at the surface have large fluctuations due to tides, heating, and cultural sources that need to be subtracted out in order to properly estimate the fracture response.

However, all the above methods may or may not work, and when they do it is with varying degrees of success. As a result, a different approach utilizing a more effective apparatus and method of diagnostic monitoring is needed.

Therefore, as explained above, a great need exists, especially in the oil and gas industry, as well as other fields, for a diagnostic apparatus and method that monitors hydraulic fracture dimensions to provide useful data on the deformations of the rock caused by the fractures.

BRIEF SUMMARY OF THE INVENTION

The inventors of the present application have recognized the above-described need. To this end, an apparatus and method for measuring deformation of rock masses around a fracture induced by hydraulic fracturing or other methods is provided. The vertical inclinometer array is constructed and arranged to measure the mechanical deformation in the vicinity of the fracture before, during and after each fracturing operation.

This is done by monitoring hydraulic fracture dimensions using remote well and treatment well diagnostic techniques. The present method and apparatus provides an additional independent method characterizing certain aspects of an induced hydraulic fracture. In addition, the present invention provides data for resolving significant unknowns with regard to hydraulic fracture modeling, fracture fluid rheology and fracture treatment design.

The present method and apparatus provides a different, alternative approach to measuring hydraulic fracture-induced deformation. Instead of using the surface tilt array with all its attendant problems, a vertical tilt array is buried at the equivalent depth of the proposed fracture. This configuration reduces surface noise, increases signal amplitudes, and decreases path lengths through mixed depositional layers. The vertical tilt array is referred to herein as an inclinometer array to distinguish it from a horizontal surface array.

To this end, an embodiment of the present invention provides a specially-designed offset well that is used to emplace a set of earth tilt instrumentation. Comprehensive fracture diagnostics experiments can then be performed using a combination of the instruments and analytical modeling techniques.

In an embodiment, the monitor well is necessary for multisite research because the comprehensive experiments which have the potential for clearly defining the dimensions of a hydraulic fracture benefit from an instrumentation array beyond that which can be fielded on a wireline retrievable system. These instrumentation arrays must be coupled to the formation, i.e., cemented in place, and properly located (vertically and horizontally) to be effective in acquiring meaningful data. This is especially true for seismic meters and accelerometers.

An embodiment of the monitor well includes instrumentation arrays cemented in-place to ensure that the instruments are secured in an environment where they are likely to function for a long time period. Thus, in the embodiment, the instrumentation arrays and their associated cabling are secured on the outside of a tubing string which is subsequently cemented in place. This "carrier" string, may be run inside of an existing casing string, i.e., the instrumentation will be grounded in the annular space of the two strings. However, no outside casing is necessary; the apparatus will operate without it. The carrier string run inside the existing string has the advantage of eliminating the risk of pressurized, saline formation waters permeating the instrumentation, thereby reducing their functional lifetime. The dual string is also more likely to facilitate the successful emplacement of the carrier string without damaging the instrumentation.

In an experiment performed by the inventors, a monitor well was drilled to a total depth of 5,000 ft and a 9⅝ in. casing was subsequently run and cemented to 2,120 ft. This experiment is discussed in detail in an article entitled, "Measuring the Hydraulic Fracture-Induced Deformation of Reservoirs and Adjacent Rocks Employing a Deeply Buried Inclinometer Array: GRI/DOE Multi-Site Project," by P. T. Branagan, N. R. Warpinski, B. Engler, and R. Wilmer, SPE 36451 (1996). This article is incorporated herein in its entirety by reference.

In the experimental arrangement, an instrument array comprising of 6 inclinometers and 30 accelerometers was secured to a tubing string and run in the wellbore to the approximate depth interval of a proposed fracture at between 4,014 and 4,882 ft. The accelerometers are used for seismic measurements in addition to the tilt measurements acquired by the inclinometers. The tubing and attached instrumentation are cemented in place, thereby allowing comprehensive fracture diagnostics experiments to be implemented.

The present apparatus and method for monitoring underground fracturing provides several advantages. For example, being downhole, across from the fracture, virtually eliminates signal interference due to cultural noise.

In addition, the apparatus and method provides the benefit of no signal interference due to solar heating effects present at the surface. A further advantage is the lack of signal degradation from the unconsolidated surface layers.

Further, the tilt signals received in the apparatus of the present invention are several orders of magnitude larger than those received at the surface using conventional methods. This is an important advantage since the large signal in both tilt axes can be used to extract information on fracture length, height, and orientation. Given sufficient reservoir information, it is also possible to deduce the fracture width. In addition, features such as the timing of height and length growth and the final propagation distribution with the fracture can potentially be resolved. Furthermore, tidal effects are so small relative to the large signal that they can be ignored, and the signal can be used directly with no elaborate signal processing to extract the usual part of the signal. These types of data must be analyzed by comparison with models of the tilt response.

An additional advantage of the apparatus and method for monitoring underground fracturing includes using an inclinometer array that is designed to measure the corresponding inclination or tilt of the adjacent formation as each hydraulic fracture is created.

Another advantage of the apparatus and method for monitoring underground fracturing includes operating the inclinometer array to provide real-time information during the treatment when the dynamics of fracture extension and width are maximized.

DETAILED DESCRIPTION OF THE INVENTION

The apparatus and method of the present invention provide the capability for measuring deformation of a rock mass around the vicinity of a fracture, commonly induced by hydraulic fracturing methods. To this end, a well is drilled offset from the proposed fracture region if an existing hole is not already present that may be used. Once the well is formed to a depth approximately equal or exceeding the depth of the proposed fracture, a plurality of inclinometers, for example tiltmeters, are inserted downhole in the well. The inclinometers are located both above and below the approximate depth of the proposed fracture. The plurality of inclinometers may be arranged on a wireline that may be retrieved from the downhole portion of the well and used again or, alternatively, the inclinometers may be cemented in place. Each embodiment provides specific advantages described further below. In either event, the inclinometers are used to measure the deformation of the rock around the induced fracture.

As discussed above, the hydraulic fracturing causes the rock around the fracture to deform in certain ways. It is an advantage of the present invention to monitor the fracturing by measuring the deformation of the rock around the fracture to determine the fracture geometry so that the information may be utilized by members of the oil and gas industry, as well as other interested parties.

The fracture has several dimensions including a height H, a width W, and a length L. These parameters cannot necessarily be controlled in the performance of a hydraulic fracturing operation. Also, these parameters are not known or readily measured since the fracturing is taking place deep within the earth. However, based upon the tilt field generated by the hydraulic fracturing operation, analysis can be performed in which the height, width and length of the hydraulic fracture can be determined using the apparatus and method of the present invention.

To this end, an offset well is dug at a distance from the hydraulic fracturing site. A string of tiltmeters, for example, are emplaced into the offset well. The tilt field is measured using the tiltmeters located a distance from the hydraulic fracture. From this information, the dimensions of the hydraulic fracturing can be deduced based upon modeling and other analyses performed using the method of the present invention.

The plurality of inclinometers are used to generate data which can be processed to subsequently form a tilt field induced by the hydraulic fracture for creating a graphical representation of the tilt field induced by the hydraulic fracture. This tilt field provides valuable information as to the height, width and depth of the fracture, as well as its location.

Figure 1A:
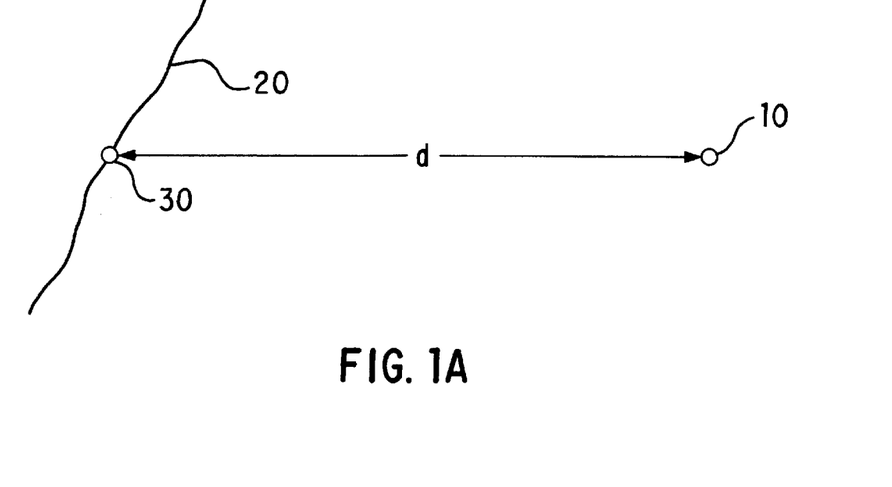
FIG. 1A is a plan view of the surface of the earth illustrating a relative arrangement of a hydraulic fracture and a tiltmeter well used in an embodiment of the present invention.

Referring specifically to the Figures, FIG. 1A is simplified a plan view of the surface of the earth illustrating the relative arrangement of an offset well 10 displaced a distance d from a hydraulic fracture 20 which also has a well 30.

Figure 1B:
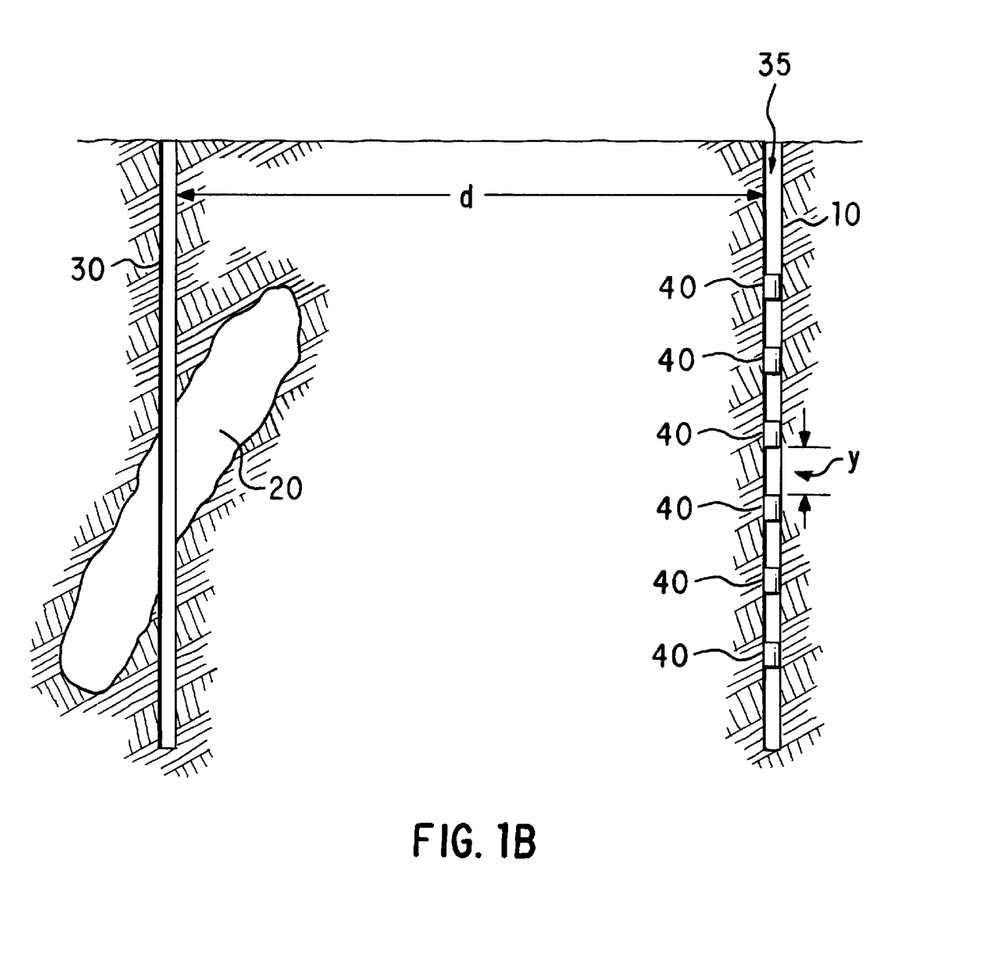
FIG. 1B is a cross sectional side view of the underground arrangement illustrated in FIG. 1A.

FIG. 1B is a cross-sectional side view of the arrangement illustrated in FIG. 1A. FIG. 1B illustrates the underground view of the offset well 10. The offset well 10 has a wellbore 35. A plurality of inclinometers 40 are positioned downhole in the wellbore 35 of the offset well 10. The plurality of inclinometers 40 which may be tiltmeters, for example, are vertically displaced at a distance y from each other. The separation distance y is selected by the user.

Figure 2:
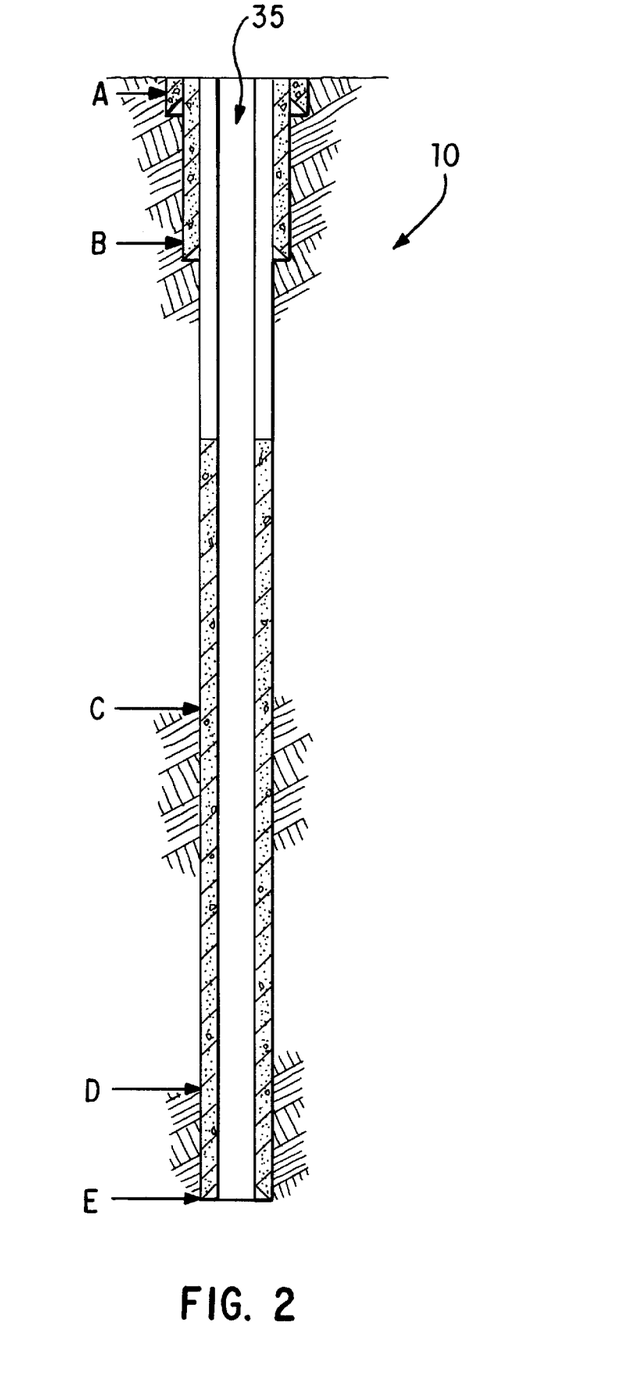
FIG. 2 is a side view of a wellbore profile of a monitor well, prior to instrument emplacement, for use in an embodiment of the apparatus and method of the present invention.

FIG. 2 is a side view of a wellbore profile of a monitor well for use in the apparatus and method of the present invention. The well 10 includes the wellbore 35. The wellbore 35 is illustrated prior to the emplacement of the inclinometers 40. The various casing descriptions, casing shoe depths, cement volumes/tops and cement types applicable at the end of the drilling phase are illustrated in FIG. 2.

For example, in an exemplary embodiment, several sections of the wellbore 35 indicated by letters A–E. The wellbore profile at A is a 20 in. diameter set at 40 ft. In addition, the cement is poured to the surface with 210 sx Class "G" cement. Letter B indicates a 13⅜ in. diameter profile with 48 lb. H-40 set at 295 ft. The cement is poured to the surface with 35 sx Class "G". Letter C indicates a 9⅝ in. diameter casing having 36 lb. J-55 cement to a depth of 3,455 ft. Letter D indicates a 9⅝ in. diameter using 40 lb. J-55 to 4,734 ft. Finally, letter E indicates a 9⅝ in. diameter casing using 40 lb. L-80 cement. This profile is set at 5,006 ft. and the cement is poured to 2,120 ft. These profile cement casing diameters and cement types are exemplary and others would also work given the installment desired.

Figure 3:
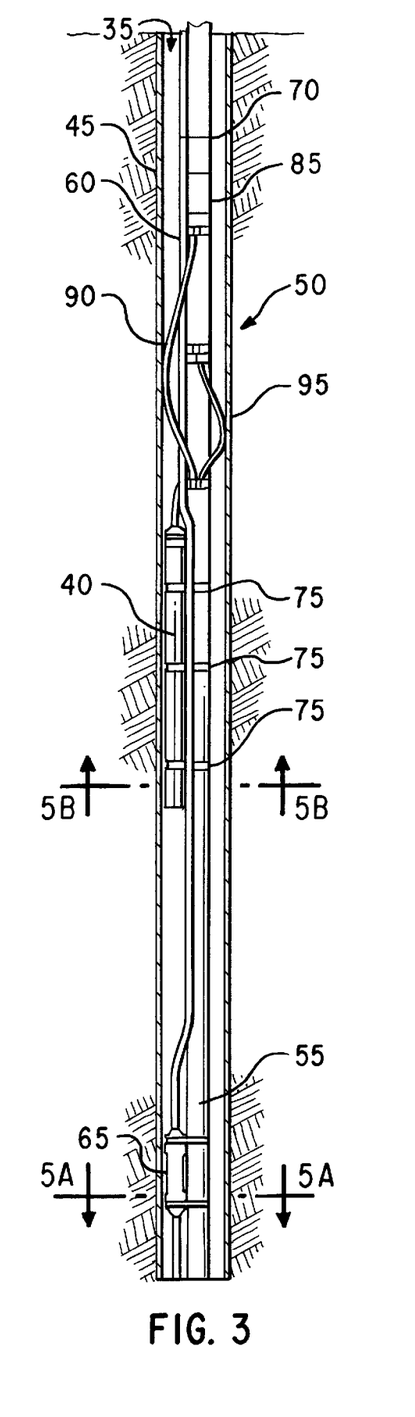
FIG. 3 is an side view illustrating a decentralizer apparatus for use in the instrument emplacement of an embodiment of the present invention.

FIG. 3 is a cross-sectional side view of a portion of the wellbore 35 of FIG. 2. A well casing 45 is shown. The well casing 45 is preferably 9⅝ in. in diameter as set forth in the embodiment above. The relative placement of the plurality of inclinometers 40 is also illustrated. FIG. 3 also illustrates an embodiment of a decentralizer apparatus indicated generally at 50. Thus, the well casing 45 encloses the wellbore 35. Located inside the wellbore 35 is a tubing string 55. In a preferred embodiment, the tubing string 55 is a 2⅞ in. tube. The tubing string 55 is located by the decentralizer apparatus 50. Thus, the tubing string 55 is slightly off-center within the wellbore 35. A cable 60 is also provided along the tubing string 55. The cable 60 is used for powering, receiving and acquiring data from the meters. In addition, a triaxial seismic instrument 65 is illustrated. However, this seismic instrument 65 is not necessary to the operation of the present invention. It merely provides additional diagnostic seismic data acquisition capability.

In a preferred embodiment, six earth tilt instruments (inclinometers 40) and a plurality of the seismic instruments 65, for example, triaxial accelerometers and the respective cabling 60 are fabricated for emplacement within the wellbore 35 of the offset monitor well 10. The instruments 40, 65 and the associated cabling 60 are connected to the tubing string 55 prior to the emplacement in the wellbore 35. The instruments 40, 65 are spaced at the intervals, for example the vertical separation distance y as shown in FIG. 1B. The tubing string 55 protects the instruments 40, 65 from abrasion and load shock by using the decentralizers 50 as the tubing string 55 is lowered into the wellbore 35. Once the instruments are placed at the approximate depth of the hydraulic fracture, for example 4,000 to 5,000 ft. in an embodiment, the entire tubing and instrumentation assembly is cemented into place within the 9⅝ in. casing 45 of the well 10 to provide a suitable seismic/mechanical coupling with the earth.

In the preferred embodiment, the tubing string 55 has a diameter of approximately 2⅞ in. The tubing string 55 is the carrier for the instruments 40, 65. To this end, FIG. 3 also illustrates a cable tie 70 securing the cable 60 to the tubing 55. In addition a plurality of bands 75 hold the inclinometer 40 to the tubing string 55. Similarly, bands 80 hold the accelerometer 65 to the tubing 55.

The decentralizer apparatus 50 includes a tubing collar 85. In addition, a long bow 90 and shorter flexible bow 95 are also components of the decentralizer apparatus 50. The decentralizer apparatus 50 is discussed further with respect to FIGS. 4, 5A and 5B.

Figure 4:
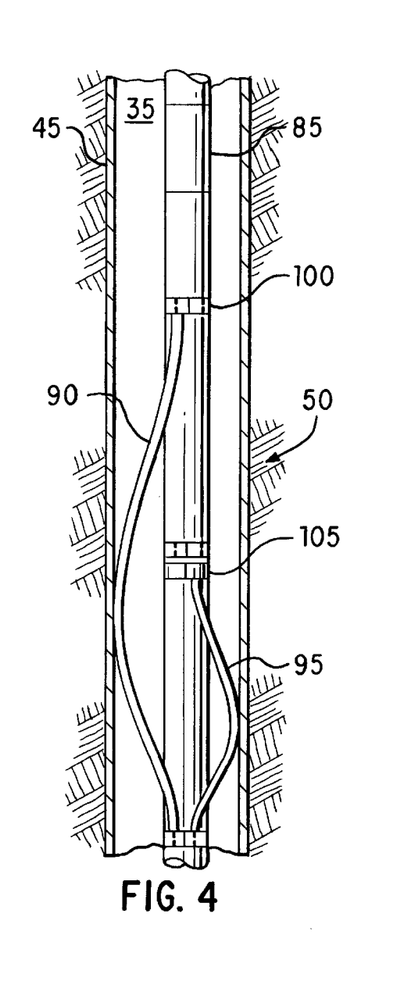
FIG. 4 is an enlarged detail side view of a portion of the decentralizer apparatus of FIG. 3.

FIG. 4 is a detailed view of a portion of the well casing 45 illustrating the decentralizer apparatus 50. A latch-on stop collar 100 is illustrated at an end of the long bow 90. Similarly, a latch-on "float collar" 105 is illustrated at an end of the shorter flexible bow 95.

In an embodiment, the seismic instrument or accelerometer 65 has a diameter of 2.75 in. and the inclinometer 40 has a diameter of 2.95 in. The geometry of the casing 45, tubing 55 and instruments 40, 65 requires that the tubing 55 be decentralized. FIG. 4 illustrates the decentralizer apparatus 50. The purpose of the decentralizer apparatus 50 is to decentralize the tubing 55 so that the instruments 40, 65 and the cabling 60 which are fixed on the tubing 55, do not touch the casing 45. The shorter bow springs 95 located opposite the long bows 90 are designed to be collapsible to a certain extent, thereby taking the weight of the tubing string 55 if it should lie on the casing wall 45.

Figure 5A:
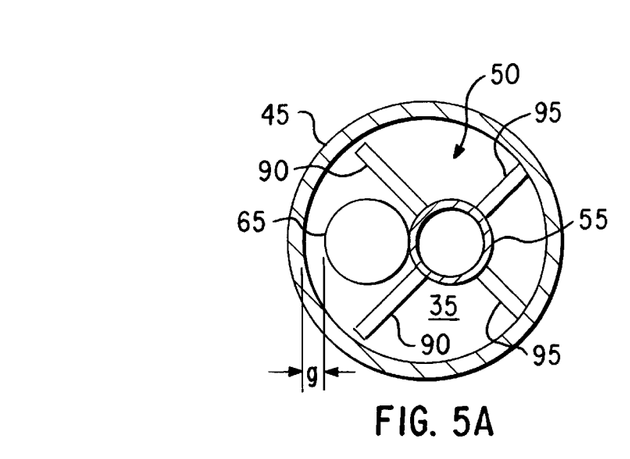
FIG. 5A is a cross-sectional top view of the decentralizer apparatus of FIG. 3 taken along line A—A.
Figure 5B:
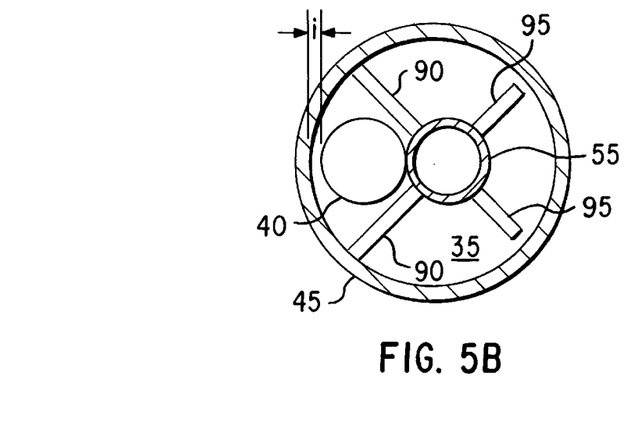
FIG. 5B is a cross-sectional top view of the decentralizer apparatus of FIG. 3 taken along line B—B.

FIGS. 5A and 5B illustrate cross-sectional views taken along FIG. 3. FIG. 5A illustrates the cross-sectional view showing the accelerometer 65. As set forth above, in a preferred embodiment, the accelerometer 65 has a diameter of 2.75 in. This combined with the diameter of the tubing 55 which is preferably 2⅞ in., provides a gap g indicated between the casing 45 and the accelerometer 65 when the decentralizer apparatus 50 is used. The long bow is 90 and the shorter flexible bows 95 are also shown in the embodiment. Similarly, FIG. B illustrates the cross-section of FIG. 3 in which the inclinometer 40 having a preferred diameter of 2.95 in. is arranged within the wellbore 35. A distance i indicated between the casing 45 and the inclinometer 40 is provided by using the decentralizer apparatus 50 as indicated in FIG. 5B. The longer bows 90 maintain the inclinometer 40 the distance i away from the casing 45. The flexible shorter bows 95 are also illustrated.

Figure 6:
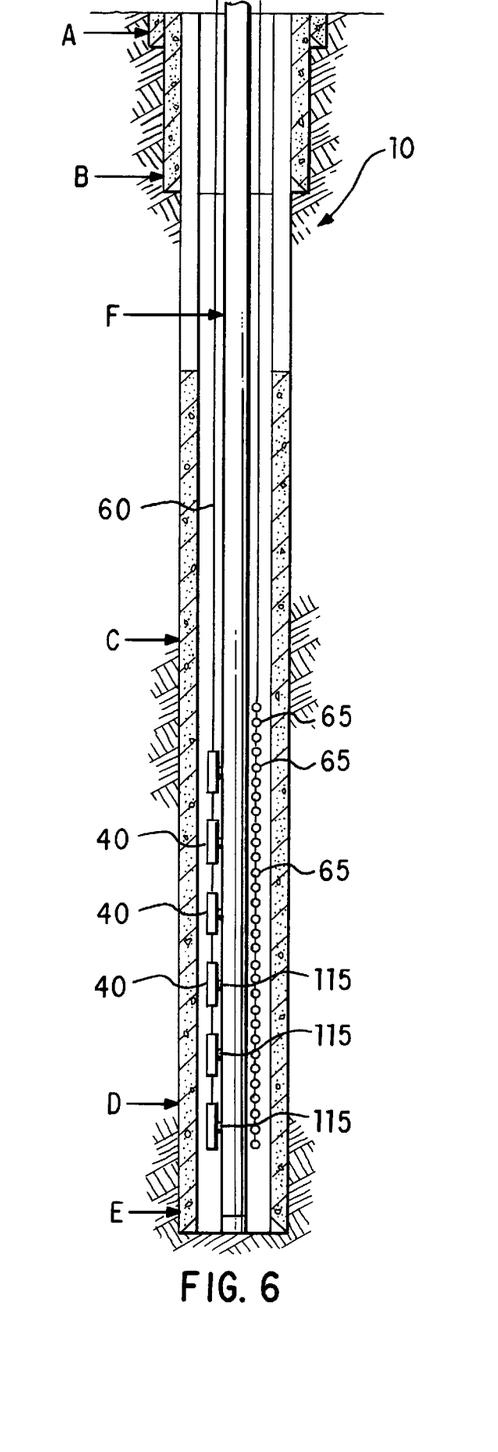
FIG. 6 is a side view of a wellbore profile of the monitor well, following instrument emplacement and cementing in position of the instruments, for use in an embodiment of the apparatus and method of the present invention.

FIG. 6 illustrates a side view of a wellbore profile of the monitor well 10 following instrument emplacement and cementing in position of the instruments 40, 65. The plurality of the accelerometers 65 are shown, as well as the plurality of inclinometers 40. The instrument cabling 60 is also illustrated. The various relative cement specifications are also illustrated as in FIG. 2. In addition, the cement added to cement in the instruments is indicated at reference letter F.

To aid in the acquisition of proper tilt data, the orientation of each axis of the inclinometers 40 is determined. As set forth above, the inclinometers 40 may comprise biaxial tiltmeters, however, triaxial tiltmeters may also be used. Additional data may be determined when triaxial tiltmeters are utilized. In either situation, the orientation of the plurality of inclinometers 40 can be determined. To this end, a radioactive tracer 115, for example, a screw, can be attached to each inclinometer 40. As shown in FIG. 6, the tracer 115 is fixed to the same axis on each of the inclinometers 40. After the plurality of inclinometers 40 are cemented-in, a logging tool can be used to detect the orientation of each inclinometer 40 by detecting the radioactivity of the tracer screw 115.

In another embodiment of the present invention, an apparatus for measuring the deformation of rock around a hydraulic fracture utilizes a reusable wireline arrangement. In the embodiment, a plurality of inclinometers, for example, tiltmeters, are connected to wireline and lowered into a wellbore. The tiltmeters are located in a tiltmeter housing. In the preferred embodiment, the tiltmeter housing also encloses a clamping motor which is connected to a gear drive and a clamp arm. Once the tiltmeter of the plurality of tiltmeters are located downhole at a preselected depth, the tiltmeter within the tiltmeter housing may be secured to a set position within the wellbore. This is done by driving the clamp arm with the clamp motor via the gear drive. This operation will secure the tiltmeter housing enclosing the tiltmeter to a set location at a set depth within the wellbore.

Once this is done, appropriate tilt data may be taken by the plurality of tiltmeters. Once sufficient data is acquired, the tiltmeters may be unclamped and removed. The wireline may be retracted from the wellbore to recover all the tiltmeters for subsequent use.

Figure 7:
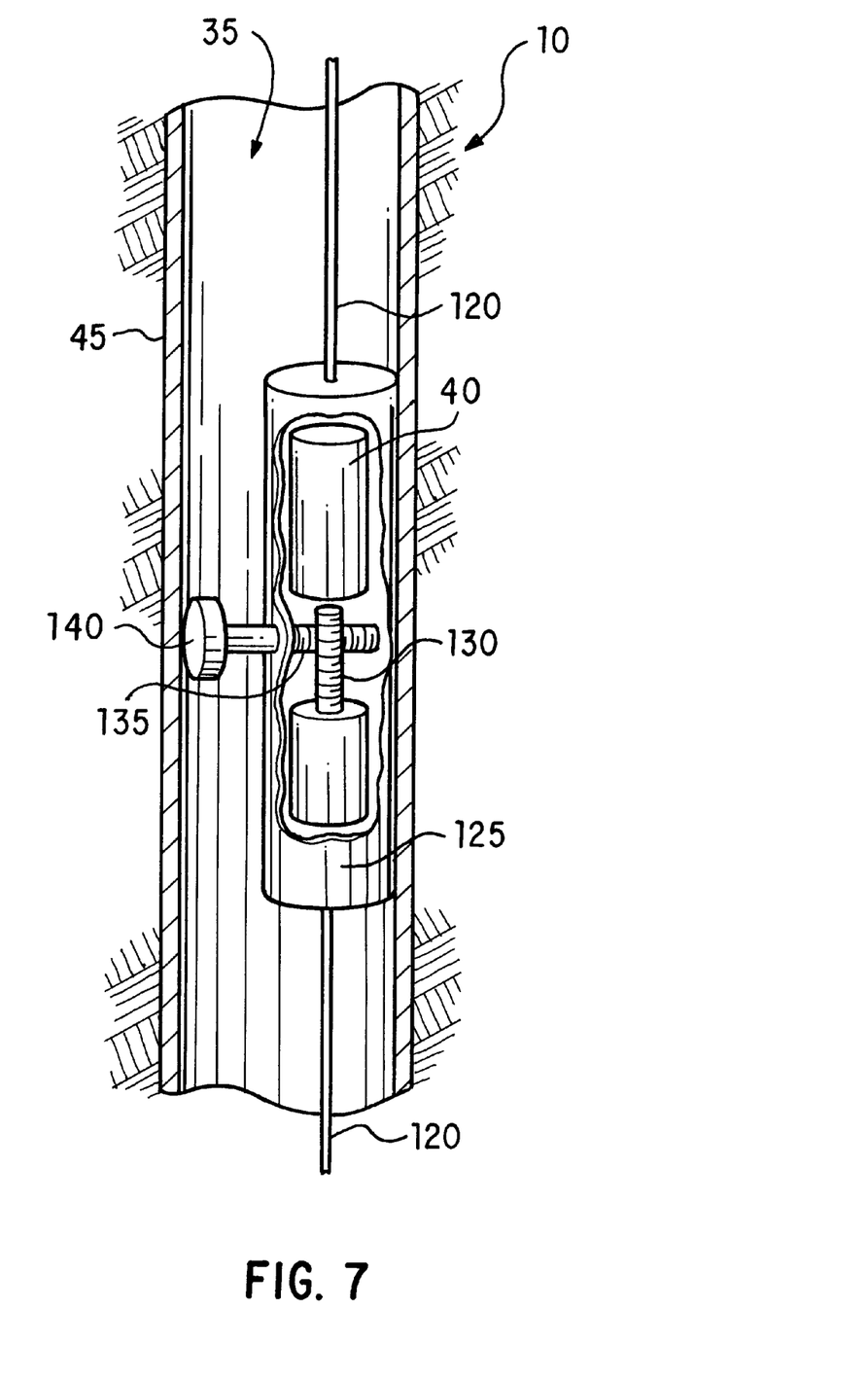
FIG. 7 is a cross-sectional side view of another embodiment of an apparatus for measuring deformation of rock in the vicinity of a fracture, illustrating a retrievable and reusable wireline inclinometer array arranged downhole in a wellbore.

Referring specifically to the Figures, FIG. 7 illustrates a portion of the wellbore 35. A wireline 120 connected to a tiltmeter housing 125 is illustrated. FIG. 7 illustrates a simplified diagram of another embodiment of the apparatus for measuring deformation of rock around the vicinity of a fracture, wherein the retrievable and reusable wireline 120 is used within the wellbore 35. In the preferred embodiment, the wireline 120 is typically a seven conductor wireline. The wireline 120 consists of seven insulated copper wires which are run inside an armor shield. This provides the capability to run it to great depths and also to avoid environmental hazards, such as water. As illustrated, the wireline 120 is lowered into the wellbore 35 of the offset monitor well 10. A tiltmeter housing 125 encloses and holds the tiltmeter 40.

Although only one tiltmeter housing 125 is shown, a plurality is connected to the wireline 120 in the preferred embodiment. Also illustrated in FIG. 7 is a clamp motor 130 connected to a gear drive 135 which is used to drive a clamp arm 140. Once the tiltmeter housing 125 is in a proper position within the wellbore 35, the clamp motor 130 is driven which actuates the gear drive 135 to press the clamp arm 140 against the casing wall 45 to maintain the tiltmeter housing 125 and the tiltmeter 40 at a preselected depth within the wellbore 35. The preselected depth is chosen so that the tiltmeter is approximately at the same depth as the fracture to be analyzed.

In addition, the plurality of tiltmeters 40 each have at least x and y axes. If triaxial tiltmeters are used, then a third, or z, axis is also present. These axes may be zeroed to provide greater sensitivity for the tiltmeter. For example, the range of the tiltmeter may only be approximately ¹⁄₁₀₀ of a degree of movement. Thus, the motor as illustrated in FIG. 7 rotates the tiltmeter until it is in proper scale. Then the tiltmeter 40 may be zeroed for proper operation. Following this zeroing operation, data may be acquired.

Similar to the cemented-in embodiment described above, the orientation of the plurality of inclinometers 40 is determined. In the wireline embodiment illustrated in FIG. 7, a gyroscope 145 is included in each tiltmeter housing 125. The orientation of each tiltmeter 40 can thereby be determined from detecting the pointing of the gyroscope 145 with respect to true north.

Figure 8:
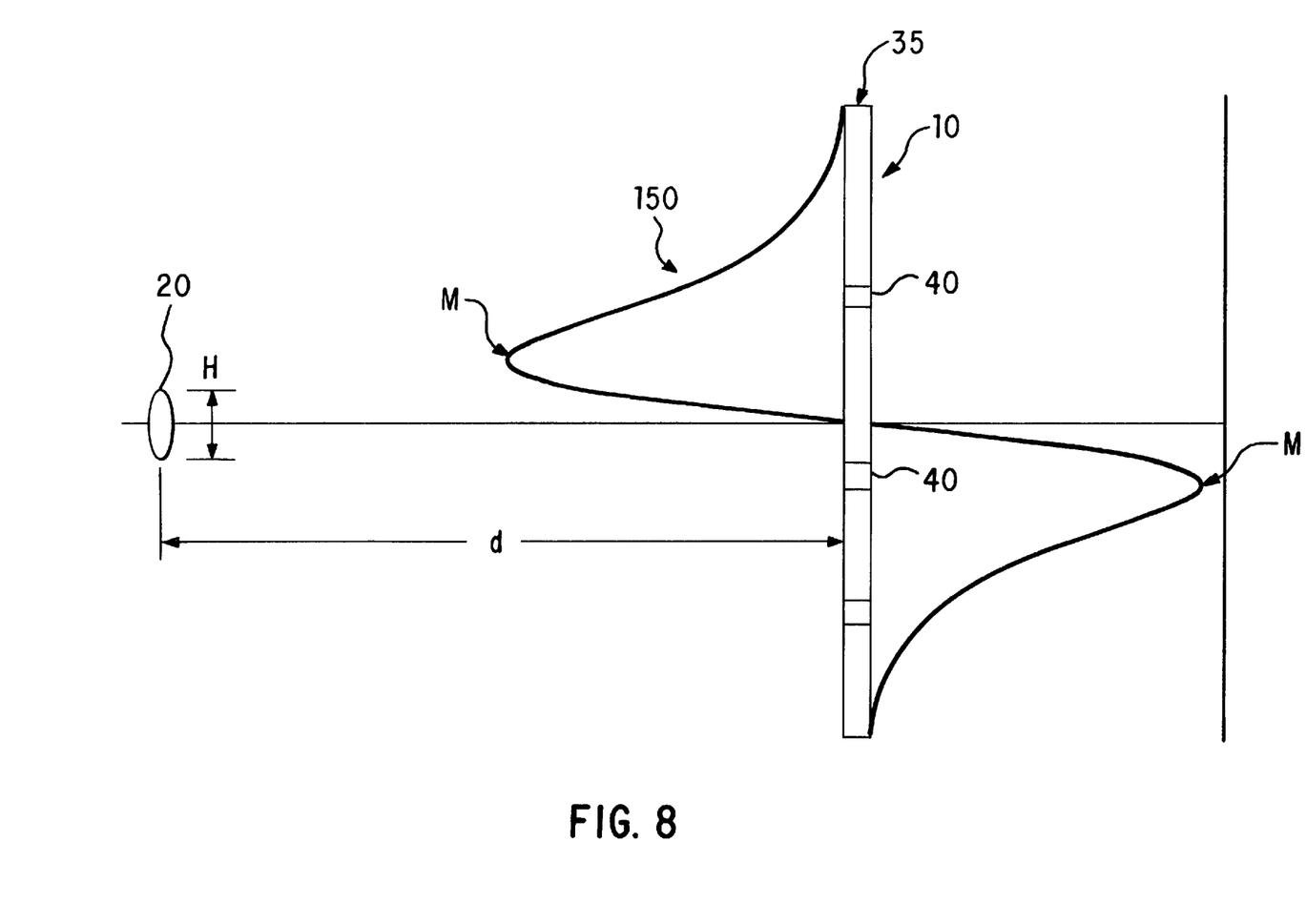
FIG. 8 is a representative tilt field curve illustrating measured rock deformation resulting from a hydraulic fracture using tilt data acquired by using an embodiment of the method and apparatus of the present invention.

A typical tilt field curve 150 representing a hydraulic fracture-induced deformation is illustrated in FIG. 8. For example, the hydraulic fracture 20 having height H (similar to FIG. 1) is located at distance d away from the well 10 having borehole 35. The plurality of tiltmeters 40 are located within the well 10 at a depth approximately equal to the depth of the hydraulic fracture 20. As shown, the tiltmeters 40 are physically located both above and below the region of the hydraulic fracture 40. This is done to provide greater sampling and coverage of the hydraulic fracture region. The distinctive curve 150 results from processing the raw tilt data acquired by the plurality of tiltmeters 40. The curve 150 indicates regions of relative maxima referenced M. The curve 150 has a maxima M in one direction on one side of the hydraulic fracture 20, and another maxima M in an opposite direction on the other side of the hydraulic fracture 20. The maxima M are reached at specific positions and then the curve falls off asymptotically.

The amplitude of the maxima M of the curve 150 basically tells how much the rock material has deformed, and also whether the fracture is getting wider or bigger. In addition, the location of maxima in a vertical direction provides information about the height H of the fracture 20. In addition, the height H relative to the distance d indicates the location of the maxima M. Further, additional information can be extracted from the tilt field curve 150.

Thus, the distinctive field curve 150 usually entails location of two peak points which are the maxima M of the curve 150. The location of the peak points M depends on the height H of the fracture 20 relative to the distance d the fracture 20 is from the borehole 35 of the well 10. As the fracture 20 goes farther away from the monitoring well 10, the peaks also go up. Similarly, as the height H of the fracture 20 grows, the peaks go up further also. Thus, since the well 10 is a fixed distance d away from the fracture region, when the peaks tend to go up, then the fracture height H is growing at a certain amount. In addition, the magnitude or amplitude of the tilt field curve 150 depends upon the height H of the fracture 20 and the width of the fracture 20. Thus, as the fracture 20 gets wider and higher, the amplitude also gets bigger.

To summarize then, the magnitude of the tilt field curve 150 depends upon the height H of the fracture 20 as well as the width of the fracture 20. In addition, the peak location on the vertical axis depends only on the height H of the fracture 20 since the distance d away from the well is relatively constant.

Figure 9:
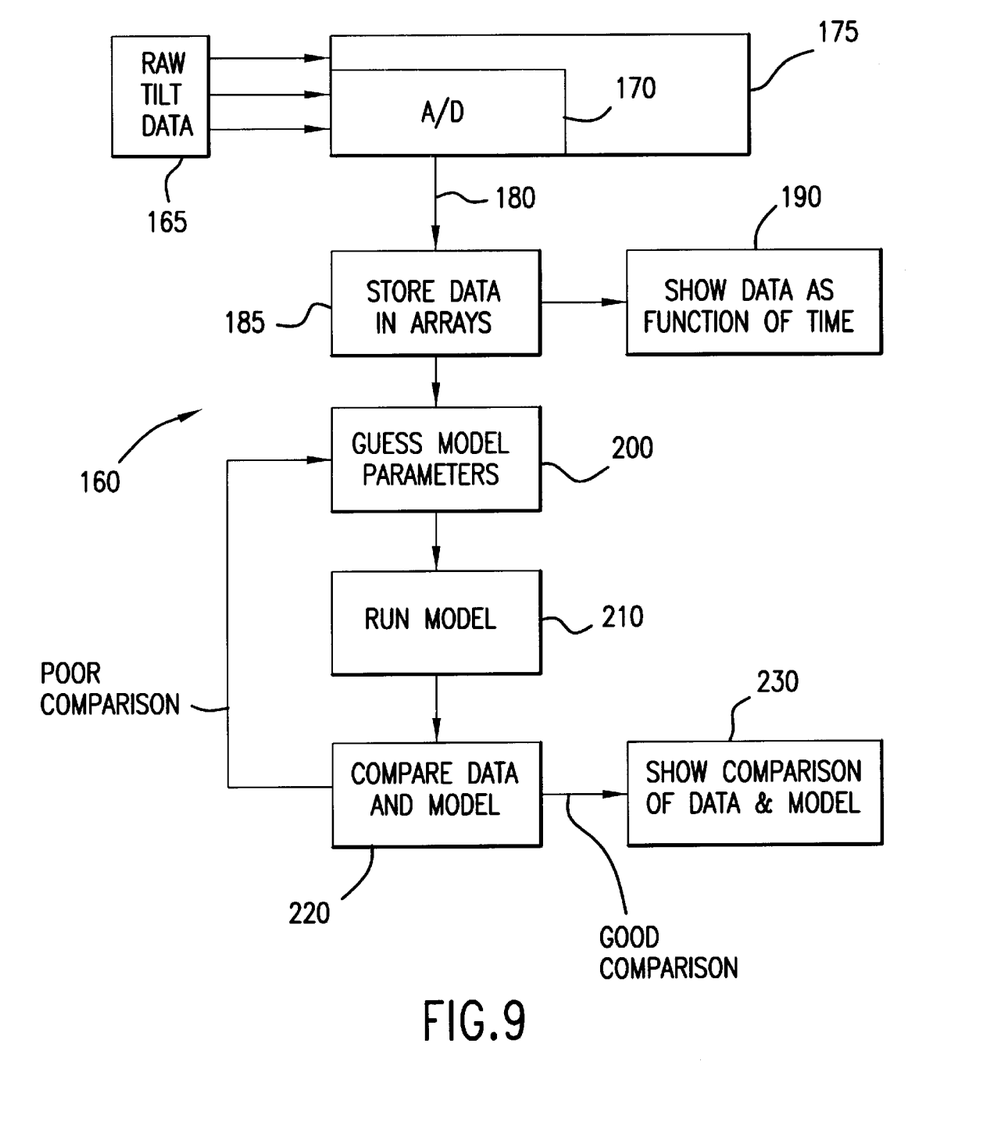
FIG. 9 is a flowchart of an embodiment of the present invention illustrating a method of measuring hydraulic fracture-induced deformation of a rock formation.
Figure 10A:
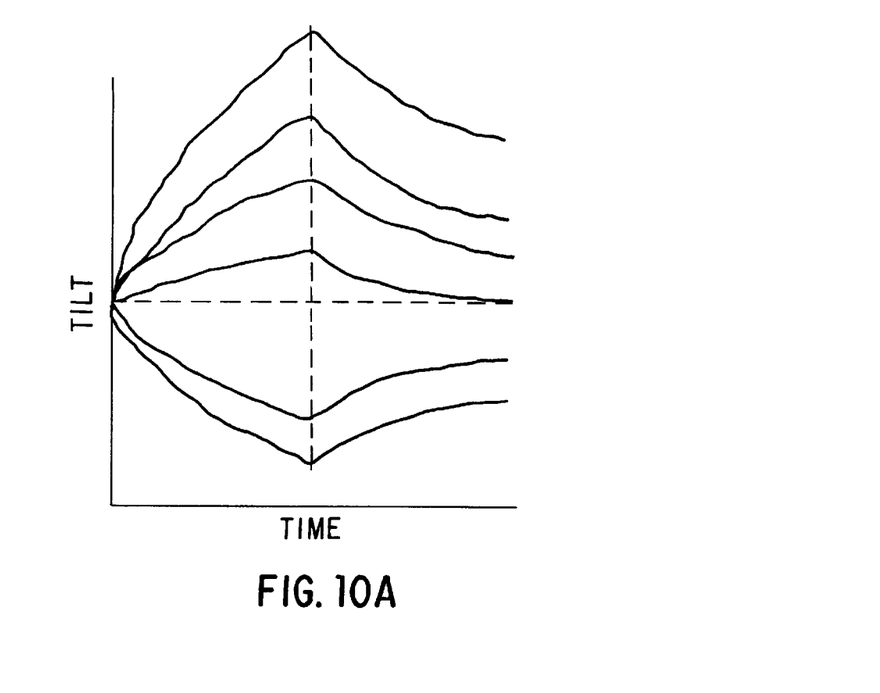
FIG. 10A is a graphical illustration of tilt data with respect to time acquired using an apparatus operating in accordance with an embodiment of the method of the present invention.
Figure 10B:
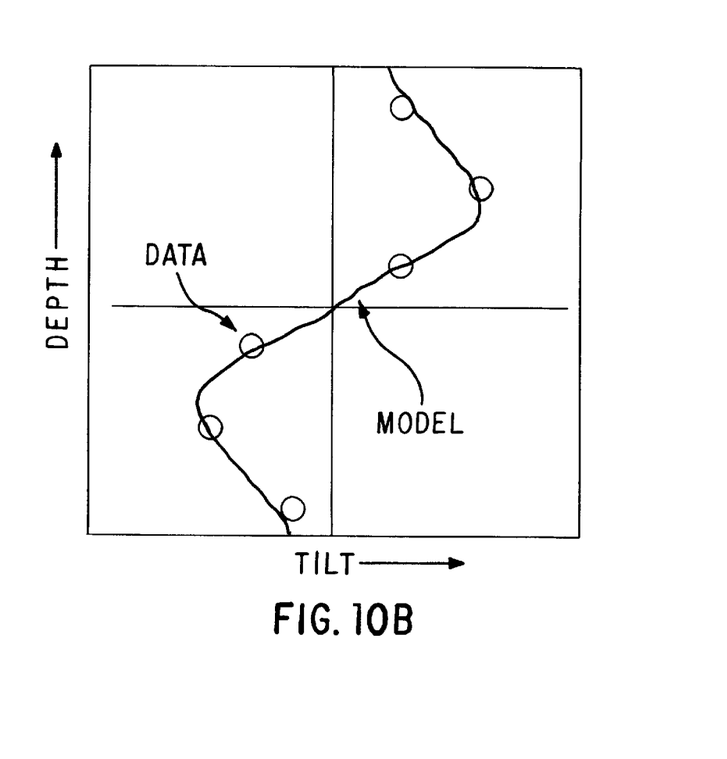
FIG. 10B is a graphical illustration of tilt data versus depth acquired using an apparatus operating in accordance with an embodiment of the method of the present invention.

FIG. 9 illustrates an embodiment of a method of the present invention in a flow chart arrangement with accompanying FIGS. 10A and 10B. As shown, the method 160 includes the step referenced at 165 of acquiring the raw tilt data from the plurality of inclinometers 40 located downhole in the well 10. The method 160 works equally well with inclinometers 40 cemented in place, as well as those clamped in place on the removable wireline 120. The raw tilt data 165 is provided as an input into a analog-to-digital converter 170 since the tilt data is primarily analog and the manipulation of the data is simplified by using digital data. The A-to-D converter 170 may be part of a computer 175 or other processor. A digital data output 180 which has been converted by the A-to-D converter 170 is then subsequently stored in data arrays as indicated in block 185. In a preferred embodiment, block 190 indicates that the data array is arranged to provide a graphical representation of the data for the inclinometers 40. The graphical representation step 190 is illustrated in FIG. 10A showing tilt along the vertical axis and time along the horizontal axis. Each individual level 1–6 indicated corresponds to the data acquired from one of the individual inclinometers 40. FIG. 10A illustrates, at its left side, an origin of the inducement of the hydraulic fracturing. Each of the individual level curves 1–6 increases as the pressure resulting from the hydraulic fracturing increases. Thus, the six curves 1–6 illustrate that as the fracture 20 grows, the tilt data also increases in the vertical direction as indicated in the graph, thereby illustrating greater tilt. The direction of the tilt vectors is essentially a reflection of the curvature of the fracture opening. Considering the cross-section of a symmetrical fracture aperture yields something like a lens that is convex on both sides with a maximum in the middle. In the middle, the forces opening the crack are pushing horizontally, i.e., normal to the tangent of the fracture surface. Up until this point, however, the normal to the aperture surface tangent is no longer horizontal. There is both a horizontal and vertical component in the force that causes the rock to tilt to varying degrees. Thus below the center line, the rock tilts as well, but in the opposite direction. This is shown in FIG. 10A wherein four of the six inclinometers 40 are located above the expected center of the fracture 20. The y axes of these devices will tilt in the opposite direction as those of the inclinometers 40 below the expected fracture center, i.e., inclinometers 5 and 6. Also inclinometers 1–4 indicated by level curves 1–4 are shown above the horizontal origin line which indicates that they are located above the hydraulic fracture region. Similarly, curves 5 and 6 indicate, in the data taken by inclinometers 5 and 6, that inclinometers 5 and 6 are located below the hydraulic fracture region.

In the monitoring of the hydraulic fracturing operation, there is an optimum location for an inclinometer. For example, levels 1 and 6 actually may be on the peak of the fracture 20 whereas inclinometers 3 and 4 are a closer in. Also, the curves may vary with time since the height of the fracture 20 also changes. If the height H changes in a sufficient amount so that an individual tiltmeter is now in a more strategic position to read optimum data, it measures a larger amplitude. Finally, the curves 1–6 indicate that the tilt increases at a rapid rate while the hydraulic fluid is pumped in. In addition, when the pumping is finished, the tilt amplitude slowly falls off as indicated by the trailing portions of each of the curves 1–6.

In addition to showing the tilt data as a function of time as discussed immediately above, the data is also used subsequently in modeling arrangement. For example, block 200 indicates that various model parameters are chosen to use with a series of inverse solid models to define specific fracture parameter such as fracture opening and closing and fracture geometry. The selected model is then run as indicated in block 210. Such a model is one of several models that are known from analytical methods for solid mechanics. For example, the cracking of a rock will induce a tilt off to a side of the material. Analytical models are available to tell what the tilt will be. Tilt typically depends on the height H, the length L, the pressure inside the fracture which is known as a measured quantity, the distance away which is also known and other material properties such as the moduli which can be given for a certain material. For example, such calculations can be performed as described in the article entitled, "Interpretation of Hydraulic Fracture Mapping Experiments," by Warpinski, paper SPE 27985, University of Tulsa Centennial Petroleum Engineering Symposium, Tulsa, Okla. (August 1994). This article is herein incorporated in its entirety by reference. Thus, a certain pressure also gives a certain deformation. Thus in the model the height H and the length L are unknown quantities which are chosen as model input parameters to be run in the model. The pressure and moduli, as well as the distance d away of the wellbore from the hydraulic fracture 20, can be measured and are known.

Thus, the user tries to utilize the information determined from the fracturing data acquired from the plurality of tiltmeters 40. A height H is then selected as well as the pressure inside the fracture and the material properties of the formation and the distance away from the fracture. A number of different models can be run which tell theoretically what the tilt field should look like for that model. As shown in block 220, the data and the model are compared. If the data comparison provides a good comparison, block 230 shows that the data will be illustrated. As shown in FIG. 10B, depth is indicated along the vertical axis and tilt is indicated along the horizontal axis. The objective is thus to iteratively run the model a number of times by choosing various H and L values to find a best fit curve along the acquired data points from the tiltmeter data. If a poor comparison of the data and the model results n block 220, the method returns to step 200 where model parameters are selected again and the model is re-run in block 210. The parameters are thus adjusted to get a better fit each time in an iterative process. This is done a number of times until the best fit curve results. This provides a solution of what the fracture parameters are, which further enables an illustration of what the fracture looks like. The tilt curve shown in FIG. 10B corresponds to the general tilt curve 150 illustrated in FIG. 1 of the distinctive curve of a tilt field induced by hydraulic fracture.

While the present invention has been described with reference to two apparatus embodiments, namely a cemented-in arrangement, illustrated in FIG. 6 as well as a removable wireline arrangement illustrated in FIG. 7, each arrangement can be operated in accordance with the method of the present invention. Additionally, each apparatus has advantages over the other in certain situations. For example, the cemented-in arrangement of FIG. 6 provides more stability and lower noise than the wireline arrangement FIG. 7. However, the cemented-in arrangement is typically much more expensive to install and requires that the instruments be disposed of since they cannot be economically removed from the well after they have been cemented-in. Since each tiltmeter costs approximately $25,000, this can be a considerable expense. However, if the accuracy of the data is critical, this is a preferred arrangement. The wire line arrangement of FIG. 7 provides the advantage of being retrievable, and therefore reusable, which lowers the cost since the instruments are not disposed of.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporating those features which come within the spirit and scope of the invention.

We claim:

1. An apparatus for monitoring hydraulic fractures comprising:
    a well having a borehole; and
    a plurality of inclinometers constructed and arranged in the borehole of the well to form a vertical tilt array, each inclinometer having two horizontal sensing axes x and y, arranged such that the x axis of each inclinometer points in a same direction.

2. The apparatus of claim 1, wherein the plurality of inclinometers are permanently fixed in the borehole of the well.

3. The apparatus of claim 1, wherein the plurality of inclinometers are cemented in the borehole of the well.

4. The apparatus of claim 1, wherein the vertical tilt array is located at an approximately equivalent depth of a proposed fracture to be monitored.

5. The apparatus of claim 1, wherein the plurality of inclinometers are arranged having a vertical displacement between each inclinometer.

6. The apparatus of claim 5, wherein the vertical displacement is approximately 70 feet.

7. The apparatus of claim 1, wherein the plurality of inclinometers are affixed to a tubing string.

8. The apparatus of claim 7, wherein the plurality of inclinometers are affixed to a tubing string located in a casing.

9. The apparatus of claim 1, wherein the plurality of inclinometers comprise biaxial tiltmeters.

10. The apparatus of claim 1, wherein the plurality of inclinometers comprise triaxial tiltmeters.

11. The apparatus of claim 1, wherein the plurality of inclinometers is at least five.

12. The apparatus of claim 1, further comprising:
    a plurality of microseismic meters vertically arranged in the borehole.

13. The apparatus of claim 12, wherein the plurality of microseismic meters are triaxial accelerometers.

14. The apparatus of claim 12, wherein the plurality of microseismic meters are geophones.

15. The apparatus of claim 1 wherein the y axes of the inclinometers are aligned approximately normal to the direction of fracture propagation.

16. The apparatus of claim 1, further comprising:
    means for locating the plurality of inclinometers away from an interior wall of the borehole.

17. The apparatus of claim 1, further comprising:
    means for detecting the orientation of the axes of the plurality of inclinometers.

18. The apparatus of claim 1, further comprising:
    a radioactive tracer attached to each of the plurality of inclinometers.

19. The apparatus of claim 18, wherein the radioactive tracer is attached to the same axis of each of the plurality of inclinometers.

20. The apparatus of claim 1, further comprising:
    circuitry means for operating the plurality of inclinometers.

21. The apparatus of claim 20, wherein the circuitry means is located in the borehole at a preselected distance from the top of the well.

22. The apparatus of claim 20, wherein the circuitry means further comprises an analog-to-digital converter.

23. The apparatus of claim 20, wherein the circuitry means further comprises a two channel analog-to-digital converter in each of the plurality of inclinometers.

24. The apparatus of claim 20, wherein the circuitry means further comprises a multi-channel analog-to-digital converter in the inclinometer located nearest the top of the well.

25. The apparatus of claim 1, further comprising:
    a computer having analog-to-digital conversion circuitry for converting analog data to digital data, the computer being connected to the plurality of inclinometers to receive the analog data therefrom.

26. An apparatus for monitoring hydraulic fractures, the apparatus comprising:
    a well having a top and a bottom with a borehole extending substantially from the top to the bottom of the well;

a plurality of inclinometers arranged on a wireline downhole in the borehole of the well to form a vertical tilt array.

27. The apparatus of claim 26, further comprising:

a vertical array of triaxial accelerometers arranged in the borehole.

28. The apparatus of claim 26, further comprising:

a vertical array of triaxial geophones arranged in the borehole.

29. The apparatus of claim 26, wherein the vertical tilt array is located at an approximately equivalent depth of a proposed fracture.

30. The apparatus of claim 26, wherein the plurality of inclinometers are arranged having a vertical displacement between each inclinometer.

31. The apparatus of claim 30, wherein the vertical displacement is approximately 70 feet.

32. The apparatus of claim 26, wherein the plurality of inclinometers are removably clamped to a tubing string.

33. The apparatus of claim 26, wherein the plurality of inclinometers comprise biaxial tiltmeters.

34. The apparatus of claim 26, wherein the plurality of inclinometers comprise triaxial tiltmeters.

35. The apparatus of claim 26, wherein the plurality of inclinometers is at least five.

36. The apparatus of claim 26, further comprising:

a plurality of microseismic meters arranged in the borehole.

37. The apparatus of claim 36, wherein the plurality of microseismic meters comprise triaxial accelerometers.

38. The apparatus of claim 36, wherein the plurality of microseismic meters comprise geophones.

39. The apparatus of claim 26, wherein the plurality of inclinometers are adjustably arranged on a tiltmeter string to provide variable spacing between the inclinometers.

40. The apparatus of claim 26, wherein each of the plurality of inclinometers is located in a housing.

41. The apparatus of claim 26, further comprising:

means for zeroing the orientation of each of the plurality of inclinometers along orthogonal axes.

42. The apparatus of claim 26, further comprising:

a gimballing motor connected to the plurality of inclinometers on each axis.

43. The apparatus of claim 26, further comprising:

means for detecting the orientation of each of the plurality of inclinometers along orthogonal axes.

44. The apparatus of claim 26, further comprising:

a gyroscope connected to the plurality of inclinometers for detecting the orientation of each of the plurality of inclinometers along orthogonal axes.

45. The apparatus of claim 26, further comprising:

circuitry means for operating the plurality of inclinometers.

46. The apparatus of claim 45, wherein the circuitry means is located in the borehole at a preselected distance from the top of the well.

47. The apparatus of claim 45, wherein the circuitry means further comprises an analog-to-digital converter.

48. The apparatus of claim 45, wherein the circuitry means further comprises a two channel analog-to-digital converter in each of the plurality of inclinometers.

49. The apparatus of claim 45, wherein the circuitry means further comprises a multi-channel analog-to-digital converter in the inclinometer located nearest the top of the well.

50. The apparatus of claim 26, further comprising:

a computer having analog-to-digital conversion circuitry for converting analog data to digital data, the computer being connected to the plurality of inclinometers to receive the analog data therefrom.

51. An apparatus for monitoring underground fracturing from a monitor borehole, the apparatus comprising:

a plurality of inclinometers in spaced relation to define a substantially linear sensing array arranged in a borehole.

* * * * *